United States Patent [19]

Strosser et al.

[11] Patent Number: 5,320,186

[45] Date of Patent: Jun. 14, 1994

[54] DRAFT CONTROL SYSTEM WITH CLOSED LOOP DROP/RAISE RATE CONTROL

[75] Inventors: Richard P. Strosser, Akron, Pa.; Charles R. Cornell, Naperville; James W. Macqueene, Willowbrook, both of Ill.

[73] Assignee: Ford New Holland, Inc., New Holland, Pa.

[21] Appl. No.: 757,173

[22] Filed: Sep. 10, 1991

Related U.S. Application Data

[63] Continuation-in-part of Ser. No. 709,184, Jun. 3, 1991, abandoned.

[51] Int. Cl.⁵ .............................................. A01B 63/10
[52] U.S. Cl. .......................................... 172/8; 172/7; 364/424.07
[58] Field of Search ...................... 172/2, 7, 8, 11, 12; 364/424.01, 424.07; 37/DIG. 1, DIG. 20, DIG. 14; 414/703; 280/407, 416.1

[56] References Cited

U.S. PATENT DOCUMENTS

| | | | |
|---|---|---|---|
| 4,132,273 | 1/1979 | Mortonson et al. | 172/2 |
| 4,518,044 | 5/1985 | Wiegardt et al. | 172/7 |
| 4,571,500 | 2/1986 | Mucheyer | 172/7 |
| 4,715,012 | 12/1987 | Mueller, Jr. | 364/424.07 |
| 4,817,499 | 4/1989 | Bellanger et al. | 172/2 |
| 4,822,962 | 4/1989 | MacCourt | 172/2 |
| 4,846,283 | 7/1989 | Batcheller | 172/10 |
| 4,852,657 | 8/1989 | Hardy et al. | 172/2 |
| 4,907,493 | 3/1990 | Bellanger et al. | 172/2 |
| 4,929,092 | 12/1990 | Bergene et al. | 172/3 |
| 4,931,967 | 6/1990 | Boe et al. | 364/571.01 |
| 4,969,527 | 11/1990 | Boe et al. | 172/7 |
| 5,143,159 | 9/1992 | Young et al. | 172/7 |
| 5,190,111 | 3/1993 | Young et al. | 172/7 |

OTHER PUBLICATIONS

SAE Technical Paper 901561 Development of the Electronic Draft Control System for the Ford New Holland 8210 Tractor.

*Primary Examiner*—Dennis L. Taylor
*Assistant Examiner*—Spencer Warnick
*Attorney, Agent, or Firm*—Griffin, Butler, Whisenhunt & Kurtossy

[57] ABSTRACT

In an automatic draft control system for positioning a hitch, velocity feedback loop techniques are employed to control the rate of movement of the hitch. When the system is operating in an open loop position control mode, a switch mounted on a tractor fender enables an operator to manually control raising/lowering of the hitch for the purpose of attaching an implement. Hitch position is sensed and a microprocessor calculates the first derivative of the hitch position signal to determine actual hitch velocity. The actual velocity is subtracted from a desired velocity value to obtain a velocity error signal. The error signal is subjected to an integral control algorithm and the integrated value is used to energize raise or lower solenoids controlling a valve which raises or lowers the hitch. When the actual hitch velocity is equal to or greater than the desired hitch velocity, the integrated value is saved. When the next raise/lower sequence is initiated the integrator is reset to the saved value. This eliminates delays in starting hitch motion. The desired velocity value may be derived from the setting of a drop rate potentiometer in which case a drop rate value is added to the integrated error signal with the result being used to modify a hitch movement command that energizes the "lower" solenoid, thereby limiting the hitch drop rate when the system is operating in a closed loop position/draft control mode.

12 Claims, 5 Drawing Sheets

DRAFT CONTROL SYSTEM WITH CLOSED LOOP DROP/RAISE RATE CONTROL

RELATED APPLICATIONS

This application is a continuation in part of U.S. patent application Ser. No. 07/709,184 filed Jun. 3, 1991, now abandoned, and is related to the following commonly owned applications, the disclosures of which are incorporated herein by reference.
Application A (Serial No. 07/709,185) for Draft control System With Dual Mode Draft Sensitivity, now U.S. Pat. No. 5,143,159.
Application B (Serial No. 07/709,237) for Wheel Speed Calibration and Slip Override Disable, now U.S. Pat. No. 5,190,111.
Application C (Serial No. 07/709,236) for Draft Control System With Safety Disconnect.

FIELD OF THE INVENTION

The present invention relates to an automatic draft control system for controlling the positioning of a hitch to which an implement, such as a plow, is attached. More particularly, this invention relates to improvements in electronic draft control systems of the type disclosed by Macqueene et al. in SAE Technical Paper No. 901561 entitled Development of the Electronic Draft Control System for the Ford New Holland 8210 Tractor.

BACKGROUND OF THE INVENTION

The aforementioned technical paper describes a microprocessor-based automatic draft control system for a three-point hitch. A tillage implement is attached to the hitch and the hitch is mounted at the rear of a tractor having pneumatic tires. A single quadrant lever, located in the tractor cab, is manually moved by the operator to generate position/draft commands which cause raising or lowering of the hitch. Draft sensors sense the draft on the hitch and a position sensor senses the position of the hitch, the sensors producing feedback signals to the microprocessor. The microprocessor responds to the position/draft commands and the feedback signals from the sensors by generating output signals for adjusting the position of the hitch by selectively energizing raise and lower solenoids associated with an electrohydraulic hitch lift valve.

The system described in the technical paper and the system disclosed in U.S. Pat. No. 4,846,283 are provided with a manually operable drop rate potentiometer whereby an operator may adjust the maximum velocity at which a hitch may be lowered. However, these systems employ an open loop rate control. The drop rate signal derived from the drop rate potentiometer modifies the hitch movement command signal which is used to control the movement of the hitch. By limiting the magnitude of the hitch movement command signal the rate of hitch drop is limited. This arrangement does not take into account variable factors such as implement weight, system temperature, valve characteristics, etc. which affect system performance. Thus, these systems do not provide the accurate velocity control necessary when an implement is lowered as it enters a field from a headland. Without accurate velocity control the operator cannot maintain an even headland.

Accurate velocity control is particularly important when an operator is using a manually actuated switch to adjust the position of the hitch. As described in the aforementioned technical paper, switches may be provided on the rear fenders of a tractor so as to be accessible to the operator as he attempts to align the hitch and implement for attachment or removal of the implement.

SUMMARY OF THE INVENTION

An object of the present invention is to provide a novel method and apparatus for controlling hitch velocity.

Another object of the invention is to provide a method and apparatus for controlling hitch velocity which takes into account such variable factors as implement weight, system temperature and valve characteristics.

A further object of the invention is to provide a method and apparatus for controlling hitch velocity by providing a closed loop velocity control circuit responsive to a hitch position signal for deriving a hitch velocity signal, and controlling the magnitude of a hitch command in accordance with the difference between the hitch velocity signal and a threshold or set point velocity value.

Still another object of the invention is to provide a method and apparatus as described above wherein the set point velocity value is selected by manual operation of a potentiometer or by manual operation of a selection switch.

The foregoing and other objects of the invention are obtained by sensing the hitch position to obtain a hitch position signal, taking the derivative of the hitch position signal to obtain a hitch velocity signal, subtracting the hitch velocity signal from the set point velocity value to obtain a velocity error signal, integrating the velocity error signal, and modifying the hitch movement command with the integrated velocity error signal.

Other objects of the invention and its mode of operation will become apparent upon consideration of the following description and the accompanying drawings.

DETAILED DESCRIPTION OF THE INVENTION

Figure 1:
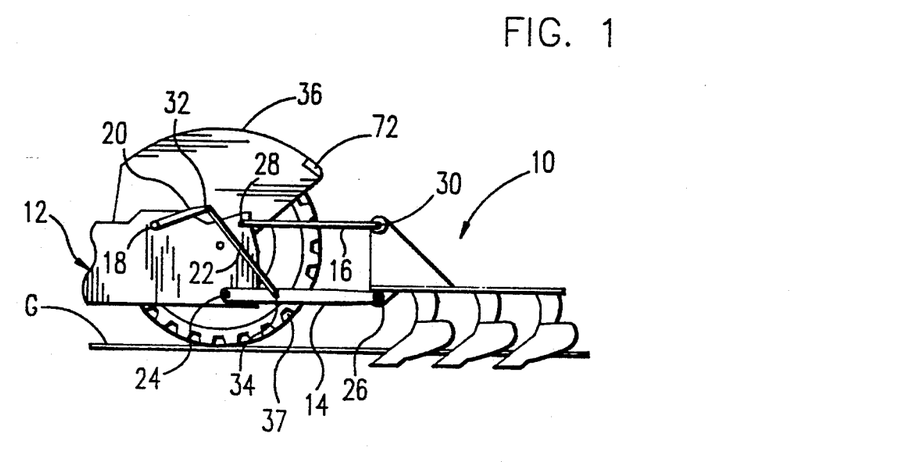
FIG. 1 illustrates a tractor-mounted hitch having a tillage implement attached thereto.

FIG. 1 illustrates a three-point hitch connecting a moldboard plow or other tillage implement 10 to the rear of a tractor 12. The hitch comprises left and right lower links 14 (FIG. 2), an upper link 16, a rockshaft 18 having crank arms 20 affixed thereto, and left and right adjustable links 22.

Figure 2:
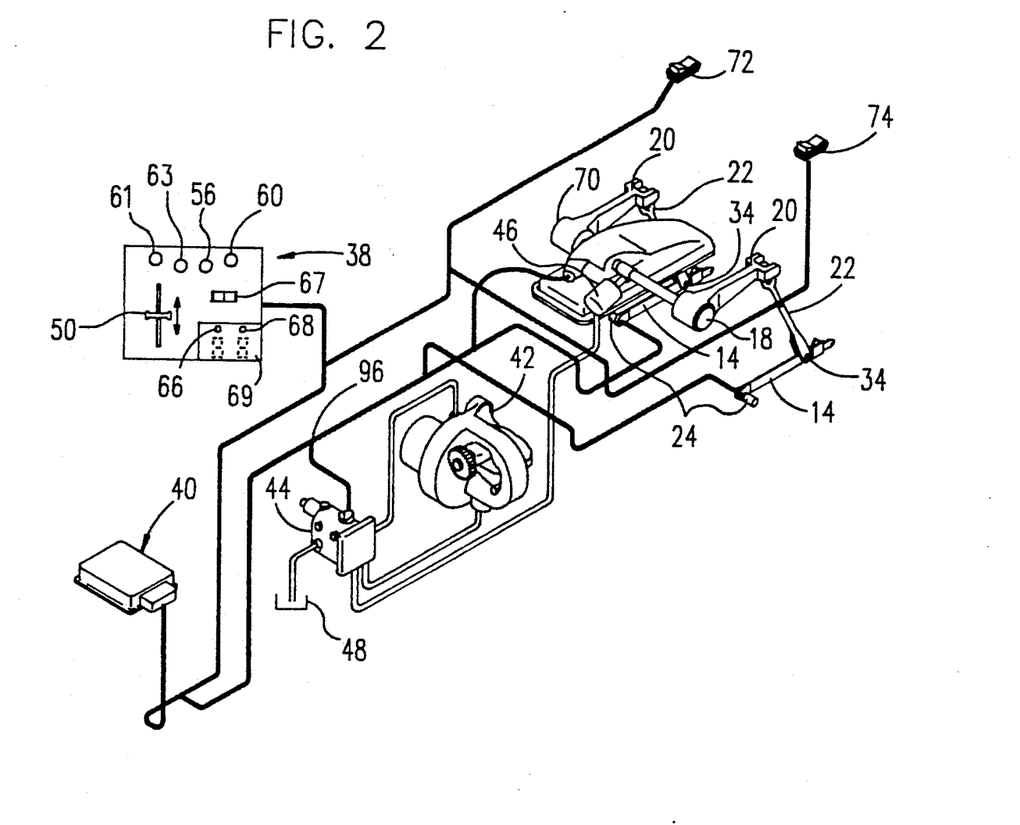
FIG. 2 is a schematic view of a three point hitch and an automatic draft control therefor.

The lower links 14 are pivotally attached at one end by pins 24 to a frame member of the tractor, and at the other end links 14 are pivotally attached to the implement 10 by pins 26. Upper link 16 is pivotally attached to a frame member of the tractor by a pin 28, and pivotally attached to implement 10 by a pin 30. Each adjustable link 22 is connected at one end by a pivot pin 32 to a crank arm 20 and connected at the other end by a pivot pin 34 to an intermediate position of a lower link 14.

The position of implement 10 relative to ground G is adjusted by rotating rockshaft 18 through an arc. In FIG. 1, as the rockshaft 18 is rotated counter-clockwise, crank arms 20 act through adjustable links 22 to pivot lower links 14 counter-clockwise about pins 24. As link pins 26 are raised, the upper link 16 prevents the weight of the implement from pivoting the implement downwardly about pins 26, and the upper portion of the implement pivots in an arc whose center is located at pin 28.

FIG. 2 schematically illustrates an automatic draft control system for controlling the movements of the hitch by controlling movement of the rockshaft 18. The control system includes an electronic draft control (EDC) console 38, a microprocessor 40, a pump 42, an electro-hydraulic proportional control valve 44, and a hydraulic lift cylinder 46.

Figure 3:
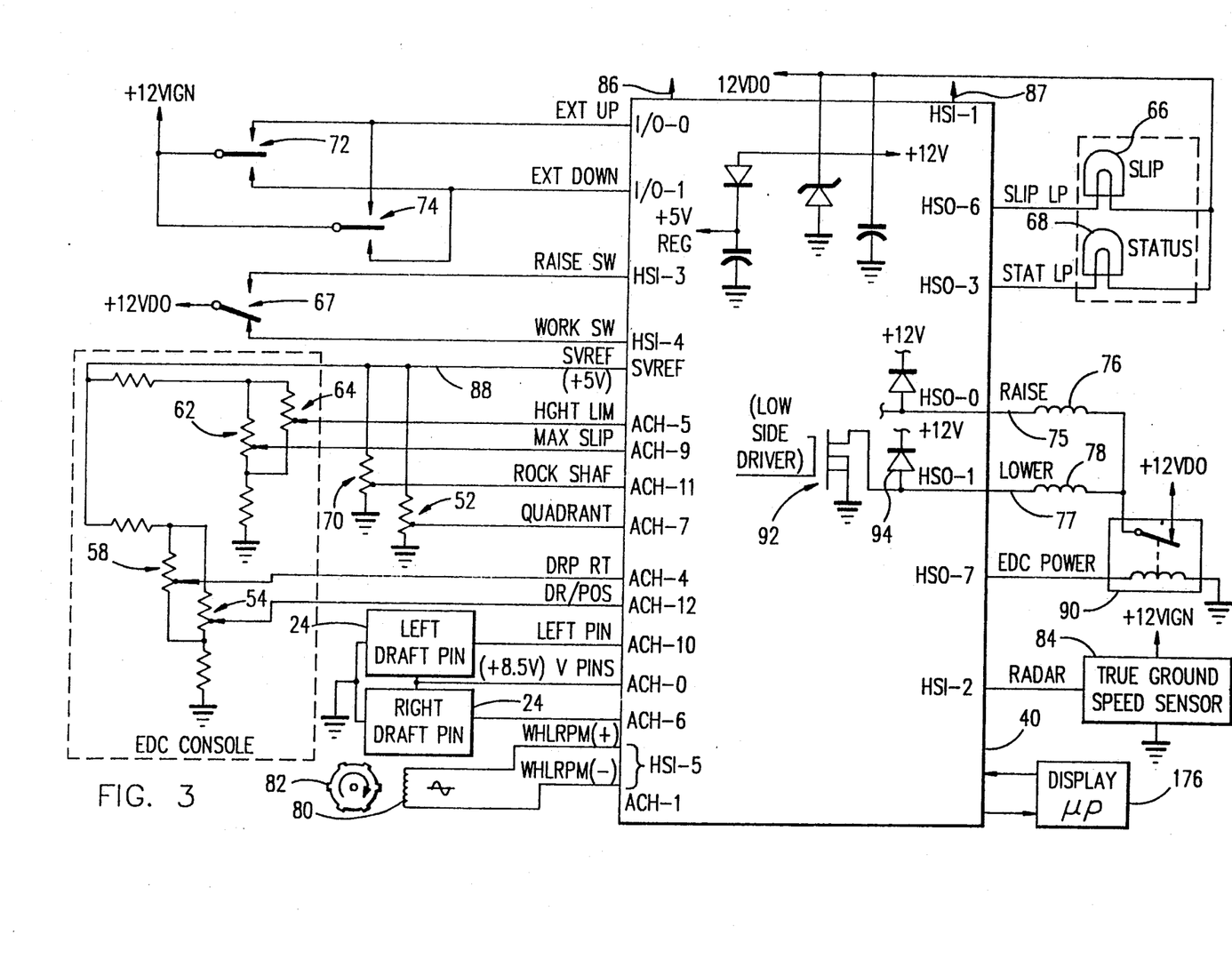
FIG. 3 illustrates the control microprocessor and inputs and outputs therefor.

The control console 38 has a hitch lift control or quadrant lever 50 which is pivoted near its lower end. As the lever 50 is moved forwardly or backwardly it actuates a potentiometer 52 (FIG. 3). The quadrant lever is used to control the positioning of the hitch. A stop (not shown) is provided for limiting forward movement of the quadrant lever 50. When the quadrant lever is moved forwardly beyond the stop, it places the control system in an open-loop or external mode which permits use of external fender switches to control positioning of the hitch.

The console also includes a position/draft mix control potentiometer 54 (FIG. 3) operated by a control knob 56 and a drop rate control potentiometer 58 operated by a control knob 60. The purpose of the control potentiometers 54 and 58 is explained below.

A digital display 69 is provided on the console to indicate the relative hitch position. In addition, the EDC console also includes a slip control knob 61 for controlling a maximum slip limit potentiometer 62, a height limit control knob 63 for controlling a height limit potentiometer 64, a slip indicator lamp 66 and an EDC status lamp 68. A work/raise rocker switch 67 is also provided on the console. This switch enables the operator to selectively raise the hitch to the height limit set by control knob 63, or lower the hitch to the position specified by the quadrant lever 50, by merely actuating the switch.

As subsequently explained, the hitch height may be controlled by a variable mix of position and draft signals. This requires that the position of the hitch and the draft be known. Therefore, a rotary potentiometer 70, driven by rockshaft 18, is provided to sense the position of the hitch. The pivot pins 24 are load sensitive pins such as those available from the Robert Bosch company and provide a means for sensing the draft. These pins provide an electrical output signal directly related to the horizontal component of the forces on the lower links 14.

To provide for manual control of the hitch position when attaching or detaching an implement 10, two three-position rocker switches 72 and 74 are mounted on the left and right fenders 36 covering the rear tractor wheels 37. Switches 72 and 74 are rendered operable by first moving the quadrant lever 50 forwardly past the stop position to initiate an external mode of operation. While the system is in the external mode, either switch 72 or 74 may be manipulated to raise or lower the hitch. The external mode, once initiated, remains in effect until the quadrant lever 50 is moved rearwardly of the stop position. The closed loop mode is restored when the hitch is "recaptured" by moving quadrant lever 50 to a position which corresponds to the present hitch position.

Generally speaking, microprocessor 40 repeatedly samples the output signals from the various sensors, switches and potentiometers, and produces a pulse width modulated signal for controlling a "raise" solenoid 76 or a "lower" solenoid 78 (FIG. 3) associated with the closed center valve 44. To raise the hitch, fluid pressurized by pump 42 is passed through the valve to extend lift cylinder 46 which rotates rockshaft 18 counter-clockwise. To lower the hitch, the "lower" solenoid is energized to dump fluid from the lift cylinder 46 through valve 44 to sump 48. The hitch falls under its own weight and rotates the rockshaft 18 clockwise to retract the lift cylinder.

Referring now to FIG. 3, the microprocessor 40 may be an EEC-IV module of the type sed by Ford Motor Company for automotive engine control. The microprocessor module comprises a type 8061 microprocessor with a 32K byte EPROM and a 16×16 bit $E^2$-PROM. The module also includes a plurality of analog input channels with A/D conversion means for converting the analog input signals to digital signals for use in the microprocessor. The outputs of potentiometers 52, 54, 58, 62, 64 and 70 and the draft sensor pins 24 are connected to the analog input channels. The fender switches 72 and 74 and the raise/work switch 67 are connected to digital inputs of the microprocessor.

The microprocessor 40 has a frequency input which is connected to a magnetic sensor 80. This sensor senses teeth on a gear 82 which rotates with the rear wheel axle of the tractor. The sensor produces an output signal at a frequency proportional to the rate of rotation of the axle. This signal is calibrated under zero wheel slip conditions as subsequently described so that it may be used as a representation of wheel speed regardless of the effective rolling radius of the wheels. A doppler radar unit 84 is mounted on one side of the tractor and directed toward the ground forwardly of the unit. The radar unit senses true ground speed and applies to the microprocessor signals representing this speed. The wheel (axle) speed sensor and radar output signals are analyzed by the microprocessor to determine the degree of tractor wheel slip.

Power for the microprocessor and EDC control system is derived from the battery of tractor 12. Battery power is continuously applied to microprocessor 40 over lead 86 to power a keep-alive memory in the microprocessor. This memory enables stored data and status information to be retained when the tractor ignition switch (not shown) is off. A voltage +12VIGN is derived from the battery through the ignition switch. The battery also provides a voltage +12VDO through a relay circuit that does not drop out until 8 seconds after the ignition key switch is turned off. This latter voltage is applied to a voltage regulator circuit within the microprocessor 40 to generate a regulated voltage +5V. This voltage is applied to logic circuits within the microprocessor. In addition, the +5 volt signal is applied over a lead 88 to the potentiometers 52, 54, 58, 62, 64 and 70. A lead 87 is connected to the ignition switch and provides a signal to the microprocessor when the switch is closed.

Insofar as the electronic draft control is concerned, the microprocessor has only five outputs. Two of these outputs are for energizing the slip lamp 66 which is energized when the degree of wheel slip exceeds the limit as set by operator adjustment of potentiometer 62 and EDC status lamp 68 which indicates if the automatic draft control is active or inactive. Two additional outputs are provided for energizing the raise solenoid 76 and lower solenoid 78 associated with the lift control valve 44. The last output energizes the coil of a safety relay 90 having a normally closed contact connected between +12VDO and the raise and lower solenoids 76 and 78.

As shown in FIG. 3, the other side of the lower solenoid 78 is connected through a low side driver 92 to ground, and through a diode 94 to +12V. The raise solenoid 76 is similarly connected to a further low side driver (not shown). Normally, the relay 90 is not energized so that +12V is applied through its normally closed contacts to the solenoids 76 and 78. When the hitch is to be lowered, the microprocessor produces a pulse width modulated signal that turns on the driver 92 thus establishing a circuit from +12V through the solenoid 78 and the driver to ground. The solenoid 78 controls valve 44 so that hydraulic flow to the lift cylinder 46 is reduced and the hitch drops because of its own weight and the weight of the implement 10. To raise the hitch, the driver for solenoid 76 is turned on to energize the solenoid. The solenoid operates the valve so that fluid under pressure is applied to the lift cylinder from the pump 42.

From FIG. 2, it is evident that the leads 75 and 77 between the microprocessor 40 and the raise and lower solenoids 76 and 78 associated with valve 44 extend from some length through a wiring harness 96. Furthermore, it is evident from FIG. 3 that if the lead 77 should be shorted to ground, the lower solenoid 78 would be energized in the same manner as if the low side driver 92 were turned on. A similar situation exists for the raise solenoid 76 if lead 75 is shorted. As explained in copending Application C, relay 90 is provided to inhibit uncommanded movement of the hitch as a result of such shorts.

The microprocessor 40 may have additional inputs and outputs permitting it to control the tractor transmission and a tractor performance monitor but these are not shown in FIG. 3 since they are not necessary for an understanding of the present invention.

Figure 4:
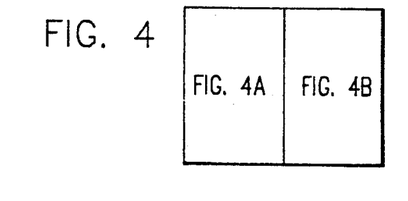
FIGS. 4A and 4B, when arranged as shown in FIG. 4 comprise a schematic diagram illustrating logic used in the automatic draft control.
Figure 4A:
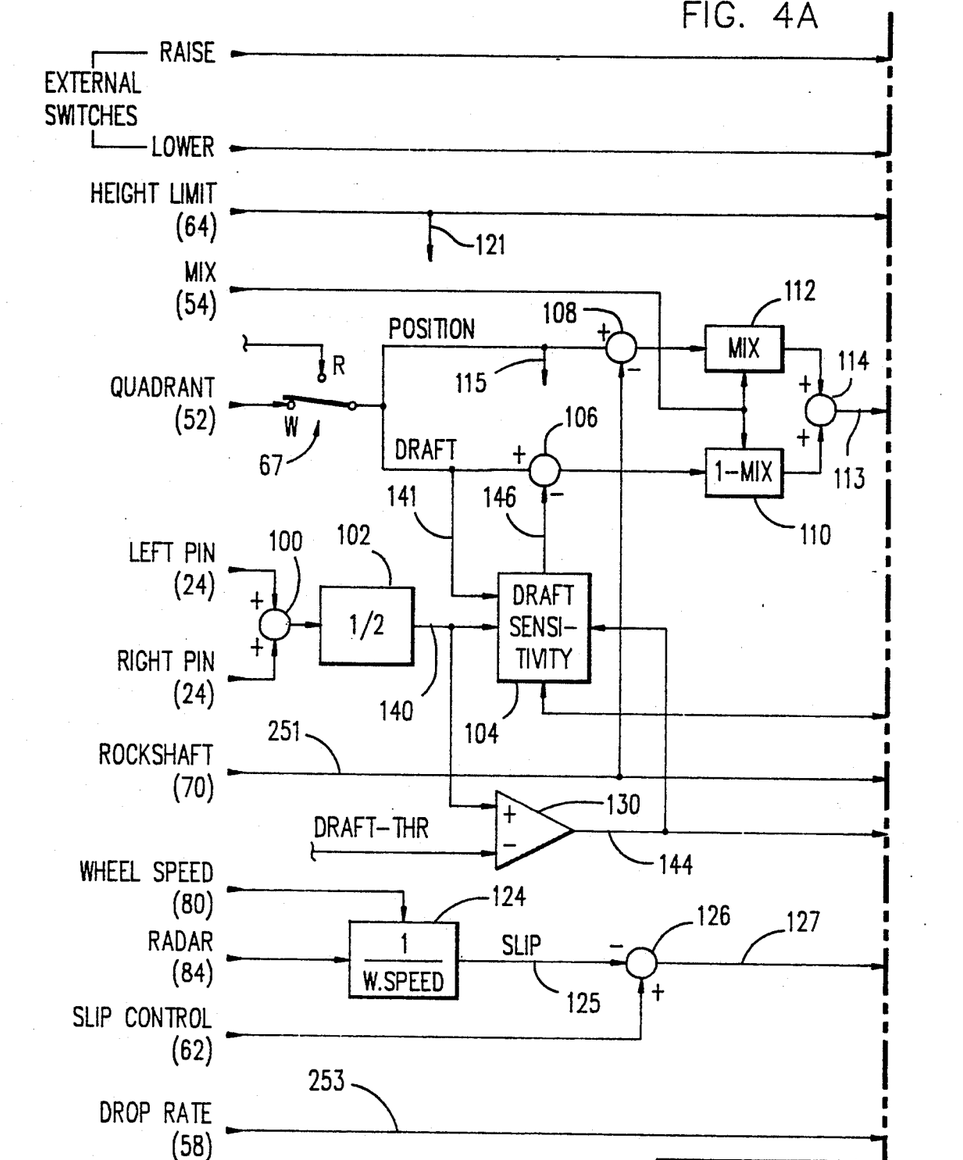
Figure 4B:
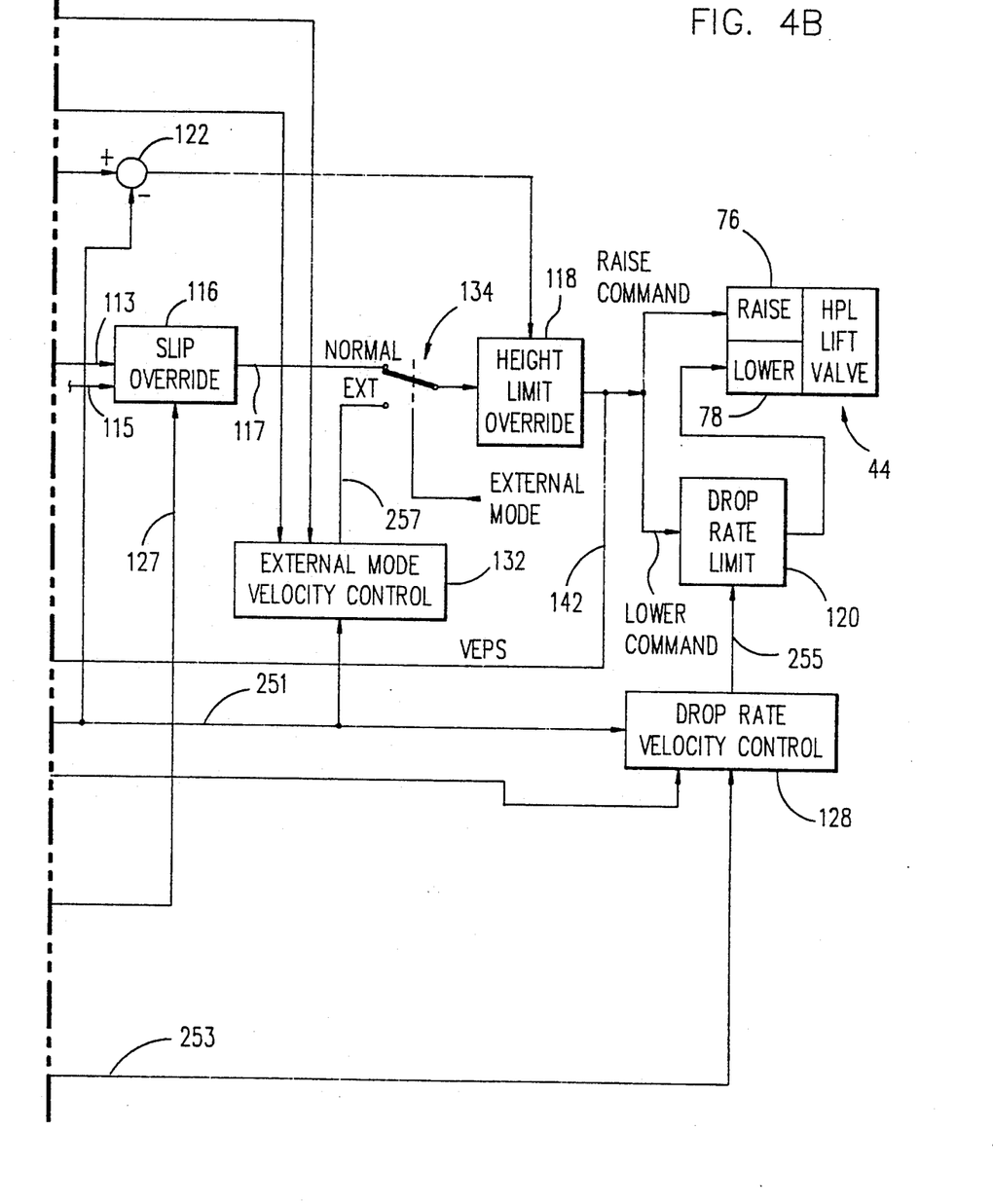

FIG. 4 is a schematic circuit diagram illustrating the logical sequence of operations performed by the program which controls microprocessor 40. These operations need not be performed by a programmed microprocessor. They could also be performed by a combination of analog or digital hardware elements and for the sake of simplicity are described herein as such.

Most of the input control signals for the electronic draft control are shown at the left of FIG. 4. These signals have been derived by sensing the various potentiometers, sensors and switches and, where appropriate, digitizing the analog signals and then digitally filtering them. Furthermore, the signals may have been subjected to a scaling function prior to the time they appear as input signals in FIG. 4. These operations are conventional and thus are not shown.

After the signals from the right and left draft sensor pins 24 are digitized, compensation made for the static weight of the hitch, and low pass filtered to eliminate frequencies above about 3.2Hz, they are added together by an adder 100 and the sum divided by 2 by a divider 102 to obtain an average composite draft feedback signal COMPDRFT_I which is applied to a draft sensitivity control 104 over a path 140. As described in copending application A, the draft sensitivity control 104 either applies the signal COMPDRFT_I directly to a subtractor 106, or low pass filters the signal before applying it to the subtractor so that frequencies above 0.5Hz are filtered out. The purpose of the draft sensitivity control is to reduce tractor vibrations which would otherwise occur as the hitch moves in response to a change in the position of quadrant lever 50.

The quadrant lever 50 (FIG. 2) provides single-lever control of both a hitch position command and a draft command. The signal derived from the quadrant lever potentiometer 52 is applied to the raise/work switch 67 and if the switch is set to the "work+ position a digitized signal (Q_EFF) is applied to the draft sensitivity control 104 over a path 141. Q_EFF is also subjected to two different shaping functions (not illustrated) to derive a draft command which is applied to a subtractor 106 and a position command which is applied to both the subtractor 108 and a wheel slip override circuit 116. The digitized output of the rockshaft potentiometer 70 is also applied to the subtractor 108 so that the subtractor produces an output proportional to the difference between the hitch position as commanded by the quadrant lever 50 and the actual hitch position as sensed by the rockshaft potentiometer 70. In like manner, the output of subtractor 106 represents the difference between the draft as commanded by the quadrant lever 50 and the actual draft as sensed by the draft sensor pins 24.

The difference values obtained by subtractors 106 and 108 are fed to two mix determining circuits 110 and 112, respectively, where the output of subtractor 108 is multiplied by a mix factor determined by the setting of mix potentiometer 54. The output of the mix potentiometer is scaled to represent a value in the range of 0.3 to 1.0. The output of the subtractor 106 is multiplied by one minus the mix factor. The resulting values obtained at 110 and 112 are then summed by an adder 114.

The value derived by adder 114 may be subjected to slip override modification at 116 or height limit override modification at 118 before it is utilized to generate a pulse width modulated signal for application to the raise or lower solenoid 76 or 78 associated with the lift valve 44. In addition, if the output at 118 calls for lowering the hitch, the "lower" command may be further modified at 120 to limit the rate at which the hitch is lowered.

Since operation of the lift valve 44 changes the position of the rockshaft and thus the position of the hitch relative to the ground, and the depth to which the implement penetrates the ground affects the signals generated by draft sensor pins 24, it is seen that FIG. 4 illustrates two inter-dependent closed loops, a position feedback loop and a draft feedback loop, with the input control for both loops being derived from the quadrant lever 50 and the control signals being weighted by the setting of the mix potentiometer 54. The above-referenced SAE Technical Paper No. 901561 describes a draft/position feedback loop of this type.

The height limit potentiometer 64 enables the operator to manually select the maximum height to which the hitch may be raised. A subtractor 122 subtracts the signal derived from the rockshaft potentiometer 70 from the signal derived from potentiometer 64. As the hitch approaches the selected height limit the raise command applied at the output of circuit 118 is forced to zero.

The slip override circuit 116 is controlled by the outputs of radar unit 84, wheel speed sensor 80, the draft command from the quadrant lever, and the slip control potentiometer 62. The radar unit measures true ground speed (TGS) while the sensor 80 measures nominal wheel speed. After correction of the nominal wheel speed value as described in copending application B, the true ground speed is divided by the wheel speed (W_SPEED) at 124 to compute the degree of wheel slip. The slip value is compared at 126 with a maximum permissible slip value set by the operator on slip control potentiometer 62. When actual slippage exceeds the selected maximum, a signal is produced on path 127 which modifies the value in the main control loop so that the hitch is raised. This lifts the implement 10 relative to the ground so as to place a smaller load on the tractor, and this in turn reduces wheel slip.

The purpose of the drop rate velocity control circuit 128 is to permit the operator to select the maximum velocity at which the hitch may be lowered. The operator selects the drop rate by adjusting the drop rate control knob 60 (FIG. 2) to thereby set the output of potentiometer 58 (FIG. 3). Once a drop rate has been selected, the circuit 128 continuously adjusts the valve "lower" command at 120 to maintain the selected hitch velocity.

Figure 5:
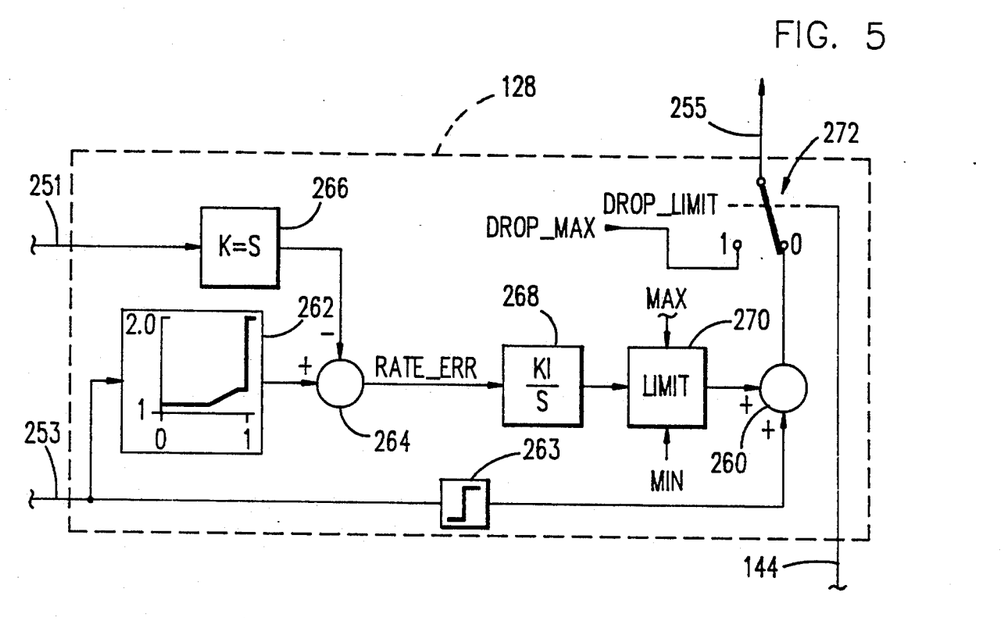
FIG. 5 is a diagram illustrating logic for the drop rate velocity control.

FIG. 5 illustrates the logic of the drop rate velocity control 128. Microprocessor 40 digitizes the output from the drop rate potentiometer 58 and subjects it to a shaping function in a signal shaper 263 or table look-up procedure, the result then being applied to adder 260 over path 253. The velocity command signal on path 253 is subjected to a further function shaping at 262 and applied to a subtractor 264.

The output of the rockshaft potentiometer 70 (FIG. 3) is digitized by microprocessor 40 and, after function shaping, is applied over a path 251 to a circuit 266 which takes the first derivative of its input. Since the output of potentiometer 70 represents the position of the hitch, the output of the derivative circuit 266 is a signal representing the rate of change of hitch position, i.e. hitch velocity. This signal is applied to subtractor 264. Subtractor 264 subtracts the actual hitch velocity as derived from differentiator 266 from the hitch velocity signal produced by function shaper 262 to derive a hitch velocity error signal which is applied to an integrator 268.

The output of the integrator 268 is a hitch velocity error signal represented in units of hitch position error. The error signal is applied to a limit circuit 270 where its magnitude is limited if it exceeds a maximum or is less than a minimum value. The output of the limit circuit is applied to adder 260 where it is added to the drop rate signal derived from the drop rate potentiometer. The output of adder 260 is then applied through a switch 272 to the drop rate limit circuit 120 where it modifies the "lower" command produced by height limit override circuit 118. The resulting valve command signal, when applied to the hitch lift valve, decreases or increases the rate of downward hitch movement to achieve the desired velocity as specified by the setting of the drop rate potentiometer 58. As the hitch moves, its position is sensed by rockshaft potentiometer 70 to provide the feedback signal to the drop rate velocity control circuit 128 so that the hitch velocity is continuously adjusted to the commanded velocity. In a typical embodiment, the drop rate may be varied from a drop time of 10 seconds to a drop time on the order of 2 to 3 seconds.

In order to maintain responsive draft corrections when the implement is in engagement with the ground, the drop rate velocity control 128 must be disabled. The average composite draft signal produced by divider 102 is applied to one input of a comparator 130 where it is compared with a threshold value. When the implement contacts the ground the draft signal exceeds the threshold value and the comparator generates an output signal on lead 144 to change the state of switch 272. This disconnects the drop velocity feedback loop and connects a maximum drop rate value to the output lead 255 of the drop rate velocity control circuit 128.

The external mode velocity control logic 132 is provided so that a consistent, slow rate of hitch movement may be obtained as the operator operates the fender switches 72, 74. Slow movement of the hitch is required to align the links 14 of the hitch with the implement 10 so that pins 26 may be inserted to connect the implement to the hitch.

The external mode velocity control logic 132 is enabled only by moving the quadrant lever 50 forward beyond a stop position so as to generate the External Mode command. In FIG. 4, this operation is equivalent to a switch as illustrated at 134. When the system is in the External Mode, the position/draft feedback control loop is open and the output of the circuit 132 is applied to the height limit override circuit 118 so that the operator may manually control the positioning of the hitch by means of the external fender switches 72, 74. The output of circuit 132 is disabled and the closed loop position mode restored by capturing the hitch by moving the quadrant lever 50 to generate a position command corresponding to the current position of the hitch.

Figure 6:
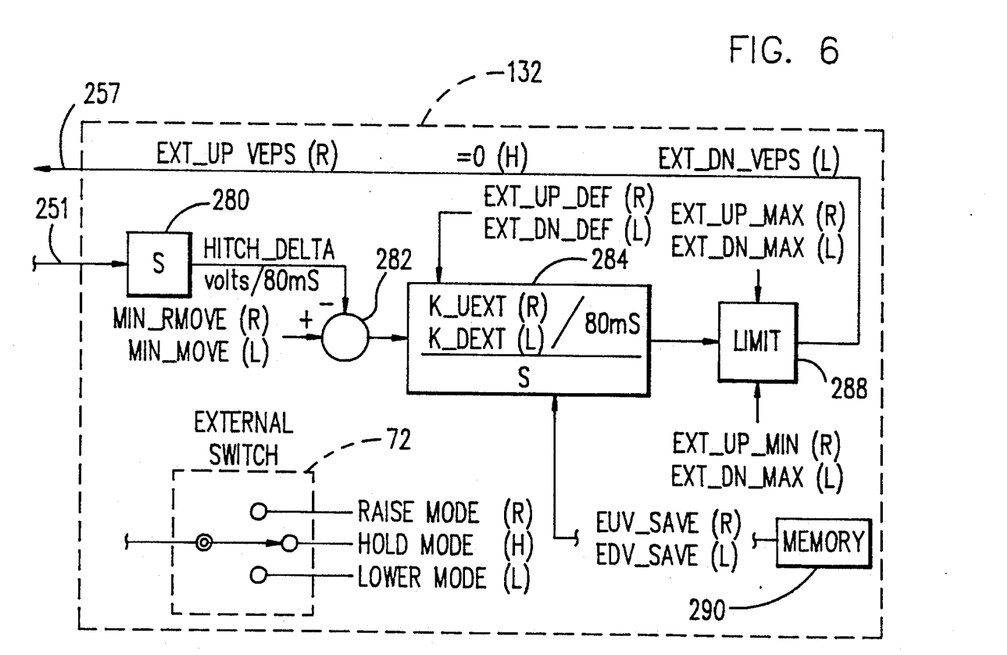
FIG. 6 is a flow diagram illustrating logic for the external mode velocity control.

FIG. 6 is a circuit diagram illustrating the logical operations performed by microprocessor 40 in controlling the hitch velocity as one of the external fender switches 72, 74 is actuated to raise or lower the hitch. Only the external switch 72 is illustrated in FIG. 6 since the microprocessor 40 responds to the switches 72 and 74 in exactly the same way.

Switch 72 is a 3-position rocker switch which produces no output signal when in its center (H=HOLD) position. In the other two positions the switch produces an output signal to the microprocessor 40 to define a Raise mode (R) or a Lower mode (L).

The hitch position signal on path 251 is derived from the rockshaft position sensing potentiometer 70 as described above and is applied to a derivative determining circuit 280. The output of the derivative circuit is the hitch velocity signal HITCH_DELTA in units of volts per 80ms where 80 milliseconds is the time interval chosen to compute the velocity. HITCH_DELTA is applied to a subtractor 282 where it is subtracted from one of two values MIN_RMOVE or MIN_MOVE depending on whether external switch 72 is in a position defining the Raise mode or the Lower mode, respectively. MIN_RMOVE and MIN_MOVE are values defining the set point or desired hitch velocity when the hitch is being raised or lowered, respectively. The output of the subtractor 282 is the hitch velocity error signal.

The hitch velocity error signal is integrated at 284 over an interval of 80ms and multiplied by one of two gain factors K_UEXT or K_DEXT depending upon whether switch 72 is defining the Raise or Lower mode, respectively. When the External Mode is entered, the integrator 284, and thus the initial hitch movement command, is set to one of two constant values EXT_UP_DEF or EXT_DN_DEF depending upon the mode defined by switch 72.

The hitch movement command produced at the output of integrator 284 is limited at 288 to a maximum value EXT_UP_MAX or EXT_DN_MAX and a minimum value EXT_UP MIN or EXT_DN_MIN depending on whether switch 72 defines the Raise or Lower mode. The resulting signal available at the output of limiter 288 is applied over path 257 and through switch 134 to the height limit override function 118. When switch 72 defines the Raise mode, the output of limiter 288 is the signal EXT_UP_VEPS and after the height limiting it is applied to the raise solenoid 76. When switch 72 defines the Lower mode, the output of limiter 288 is the signal EXT_DN_VEPS and after bypassing or passing through the height limiting function without change, it is applied through the drop rate limit function 120 to the "lower" solenoid 78.

When the switch 72 defines the Hold mode (H), the signal on lead 257 is zero so that movement of the hitch is stopped. Placing switch 72 in its center position removes all input signals to FIG. 6 except for the hitch position signal on lead 251, and the output of limit circuit 288 goes to zero.

Each time that a lower (or raise) sequence is started, the integrator 284 is reset to an initial hitch movement command value EDV_Save (or EUV_Save) which is the initial command to the lower or raise solenoid for the hitch lift valve 44. The algorithm is adaptive in that EDV_Save (or EUV_Save) is updated to be equal to the output of limiter 288, less a small amount, when the actual hitch velocity is greater than or equal to the desired hitch velocity. Thus, the next time an external lower (or raise) command is initiated the algorithm starts with the srored (in a memory 290) updated value of EDV_Save (or EUV_Save). This eliminates delays in initiating hitch motion and if the initial value results in a velocity faster than the desired velocity, the algorithm quickly integrates to the correct value.

From the foregoing description it is seen that the present invention provides closed loop feedback control of hitch velocity so as to achieve consistent performance regardless of variations in implement weight, system temperature or pilot pressure or other valve characteristics. Furthermore, the invention provides slow and smooth hitch movement in response to actuation of manual switches thus making it easier for an operator to adjust the hitch height when attaching or removing an implement.

While a preferred embodiment of the invention has been described with reference to hitch velocity control of a hitch carrying a ground engaging implement, it will be understood that the basic principles of the invention are applicable to velocity control of other devices such as the header on a forage harvester or combine or the bucket on a loader. It is intended therefore that the invention be limited only by the scope of the appended claims.

The invention in which an exclusive property or privilege is claimed is defined as follows:

1. In an electronic draft control system for controlling the positioning of a vehicle-mounted hitch, said system including position sensing means for sensing the position of the hitch and producing a position signal representing the position of the hitch and a command generating means for generating a hitch movement command, said system being operable in a closed loop mode wherein the command generating means is responsive to the position sensing means and an input command for controlling positioning of the hitch, and operable in an open loop mode wherein the movement of the hitch is controlled by a hitch movement command selected by a manually operable switch, the improvement comprising:

first means operable at least when the system is in the closed loop mode for limiting the velocity of the hitch to a set point value selectable by manual operation of a potentiometer; and second means operable when the system is in the open loop mode for limiting the velocity of the hitch to one of two set point values selectable by the switch, wherein said first and second means each comprises derivative means responsive to the position sensing means for producing a hitch velocity signal;

means responsive to the hitch velocity signal and a selected set point value for producing a velocity error signal;

means for integrating the velocity error signal; and wherein said first means further includes means responsive to the integrated velocity error signal and a signal representing the selected set point value for producing a sum signal representing the sum of the integrated velocity error signal and the signal representing the selected set point value; and means responsive to the sum signal for limiting the hitch movement command.

2. System according to claim 1 wherein said second means further include means for storing the value of the hitch movement command for subsequent use as an initial value.

3. System according to claim 1 further including means for limiting the integrated velocity error signal.

4. System according to claim 1 wherein said second means further includes multiplier means for multiplying the integrated hitch velocity error signal by a gain factor.

5. System according to claim 1 further including means to disable the first means when the system is used for draft control.

6. System according to claim 1 wherein said first means further includes means for shaping the signal representing the set point value.

7. In a method for controlling the positioning of a vehicle-mounted hitch, the method including sensing the position of the hitch and producing a position signal representing the position of the hitch and generating a hitch movement command, the method being operable in a closed loop mode whereby the hitch movement command is generated responsive to the position signal and an input command for controlling positioning of the hitch, and operable in an open loop mode wherein the movement of the hitch is controlled by a hitch movement command selected by the manual operation of a switch, the improvement comprising:

first limiting the velocity of the hitch to a set point value selectable by manual operation of a potentiometer at least when the system is in the closed loop mode and, second limiting the velocity of the hitch to one of two set point value selectable by the switch when the system is in the open loop mode wherein both first and second limiting steps each comprises:

producing a hitch velocity signal by taking the derivative of the position signal;

producing a velocity error signal by subtracting the hitch velocity signal from a signal representing one of said selected set point values;

integrating the velocity error signal; and wherein said first limiting step further includes producing a sum signal representing the sum of the integrated velocity error signal and the signal representing the selected set point value; and for finally limiting the hitch movement command responsive to the sum signal.

8. Method according to claim 7 wherein the second limiting step includes storing the value of the hitch movement command for subsequent use as an initial value.

9. Method according to claim 7 further including limiting the integrated velocity error signal.

10. Method according to claim 7 wherein said second limiting further includes multiplying the integrated hitch velocity error signal by a gain factor.

11. Method according to claim 7 further including disabling the first limiting when the system is used for draft control.

12. Method according to claim 7 wherein the first limiting step further includes sharing the signal representing the selected set point value.

* * * * *